(12) United States Patent
Carroll et al.

(10) Patent No.: US 8,147,328 B2
(45) Date of Patent: Apr. 3, 2012

(54) APPARATUSES, METHODS AND SYSTEMS FOR GAME MECHANICS FOR GIFTING

(75) Inventors: Dorion Carroll, San Francisco, CA (US); Bill Mooney, San Francisco, CA (US); Matthew Ocko, San Francisco, CA (US)

(73) Assignee: Zynga, Inc., San Francisco, CA (US)

( * ) Notice: Subject to any disclaimer, the term of this patent is extended or adjusted under 35 U.S.C. 154(b) by 0 days.

(21) Appl. No.: 12/895,692

(22) Filed: Sep. 30, 2010

(65) Prior Publication Data

US 2011/0212769 A1     Sep. 1, 2011

Related U.S. Application Data

(60) Provisional application No. 61/277,979, filed on Sep. 30, 2009.

(51) Int. Cl.
  *A63F 9/24* (2006.01)
  *G06F 19/00* (2011.01)
(52) U.S. Cl. .......................................... 463/29; 463/40
(58) Field of Classification Search ................ 463/1, 23, 463/25, 29, 40–42; 700/90, 91
See application file for complete search history.

(56) References Cited

U.S. PATENT DOCUMENTS

| | | | | |
|---|---|---|---|---|
| 6,168,522 B1 * | 1/2001 | Walker et al. | ................... | 463/25 |
| 7,136,617 B2 * | 11/2006 | Libby | ........................... | 434/350 |
| 7,637,806 B2 * | 12/2009 | Rhyne et al. | ..................... | 463/9 |
| 2004/0143852 A1 * | 7/2004 | Meyers | ........................ | 725/133 |
| 2007/0129126 A1 * | 6/2007 | Van Luchene | .................... | 463/1 |
| 2009/0132655 A1 * | 5/2009 | Behrens | ........................ | 709/204 |

* cited by examiner

*Primary Examiner* — David L Lewis
*Assistant Examiner* — Robert Mosser
(74) *Attorney, Agent, or Firm* — Martine Penilla Group, LLP

(57) ABSTRACT

The APPARATUSES, METHODS AND SYSTEMS FOR GAME MECHANICS FOR GIFTING ("GGM") transform social graph, interactions, behavior and characteristics data inputs via various GGM components to create optimal gift-giving dynamics. In one embodiment, the GGM may receive a request to provide a gaming resource to a user. In response to the request, the GGM may aggregate and analyze interaction data to identify a provider with prior interactions with the user. The GGM may in turn request the provider for a gaming resource. The GGM may receive may receive an indication to provide a gaming resource to the user in response to the request and may facilitate providing of a gaming resource to the user. The GGM may identify this indication as an instance of interaction and may update the user interaction data accordingly.

21 Claims, 11 Drawing Sheets

RESOURCE REQUEST AND PROVISION DATAFLOW

RESOURCE REQUEST AND PROVISION DATAFLOW

FIGURE 6

Resource Receiver 6 15

| Resource Provider 6 20 | | Level 1 | ⋮ | Level 10 | ⋮ | Level 20 | ⋮ | Level 30 |
|---|---|---|---|---|---|---|---|---|
| | Level 1 | X | X 6 05 | X | X | X | X | X |
| | ⋮ | Wiretap device | ... | ... | ... | ... | ... | ... |
| | Level 16 | ... | ... | Motorcycle | ... | X | ... | X |
| | ⋮ | ... | ... | Alarm system | ... | Tripwire | ... | ... |
| | Level 30 | Armored truck | ... | Cards 6 10 | ... | Untraceable cell phone | Sting grenade | X |
| | ⋮ | ... | ... | ... | Motion detector | Bouncer | Sandbag wall | ... |
| | Level 40 | ... | Mystery bag | ... | ... | Computer set-up | ... | Set of night vision goggles |

PRE-APPROVED RESOURCE LOOK UP TABLE

DYNAMIC GIFTING COMPONENT

PROVISION OF RESOURCE AND REWARD DATAFLOW

APPARATUSES, METHODS AND SYSTEMS FOR GAME MECHANICS FOR GIFTING

RELATED APPLICATIONS

Applicant hereby claims priority under 35 USC §119 for U.S. provisional patent application Ser. No. 61/277,979 filed Sep. 30, 2009, entitled "GIFTING GAME MECHANIC FOR ONLINE GAMES."

For additional teachings of various uses of social graphs, see U.S. provisional patent application Ser. No. 61/179,345 filed May 19, 2009, entitled "DIRECT EMBEDDING OF GAMES INTO THIRD PARTY WEBSITES" and U.S. patent application Ser. No. 12/778,956 filed May 12, 2010, entitled "EMBEDDING OF GAMES INTO THIRD PARTY WEBSITES."

The entire contents of the aforementioned applications are herein expressly incorporated by reference.

This patent document disclosure contains material that is subject to copyright, mask work, and/or other intellectual property protection. The respective owners of such intellectual property have no objection to the facsimile reproduction of the patent document disclosure by anyone as it appears in published Patent Office file/records, but otherwise reserve all rights.

FIELD

The present invention is directed generally to an apparatuses, methods, and systems of optimizing gift-giving dynamics and more particularly, to APPARATUSES, METHODS AND SYSTEMS FOR GAME MECHANICS FOR GIFTING.

BACKGROUND

Online gaming systems allow user to play games with other users using suitable networked user devices (computers, consoles, etc.). Some online games have a small number of players at a time, such as chess or bridge, while others such as massively multiplayer online (MMO) games have thousands of users participating at once. Examples of user devices include general purpose computers, XBOX Live™ consoles, iPhones™ cell phones, etc. Examples of MMO games include the World of Warcraft™ MMO ("WoW"), the Second Life™ MMO, Zynga's Mafia Wars™, etc.

SUMMARY

The APPARATUSES, METHODS AND SYSTEMS FOR GAME MECHANICS FOR GIFTING (hereinafter "GGM") transform social graph, interactions, behavior and characteristics data inputs via various GGM components to create optimal gift-giving dynamics.

In one embodiment, the GGM may process a request to provide a gaming resource to a user by aggregating user interaction data. The GGM may analyze the aggregated user interaction data in order to identify a provider who may have had prior interactions with the user. The GGM may then transmit the received request for a gaming resource to the identified provider. The identified provider may in one embodiment provide a gaming resource to the user.

BRIEF DESCRIPTION OF THE DRAWINGS

The accompanying appendices and/or drawings illustrate various non-limiting, example, inventive aspects in accordance with the present disclosure:

FIG. 6 is a look up table illustrating allocation of pre-approved resources in one embodiment of the GGM;

Figure 1:
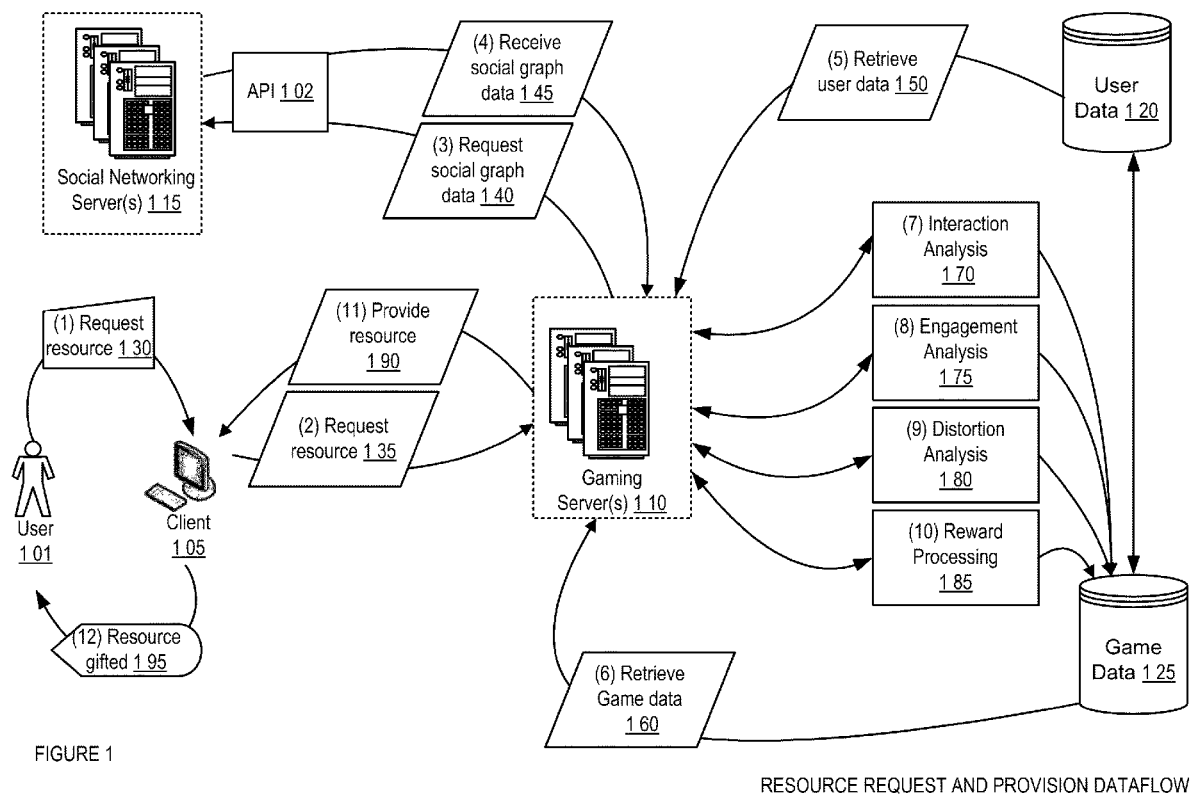
FIG. 1 is a data flow diagram illustrating processing of a resource request in one embodiment of the GGM.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Overview

This disclosure details the implementation of APPARATUSES, METHODS AND SYSTEMS FOR GIFTING GAME MECHANICS (hereinafter "GIFTING GAME MECHANICS"). Online game platforms allow users to play online games with their friends. Operators of such online games may seek to retain and expand their user base in an effort to maximize their revenues. Embodiments of GGM may facilitate expansion of game user base by leveraging users' social graph.

In one embodiment, social graph information may describe a user's relationship with others. For example, user Alice may be a friend of user Bob, implying that Alice and Bob have some type of relationship. In one implementation, the relationship can be explicit, such as a relationship stored in a social network database that links Alice's user record to Bob's user record (e.g., Social Graph table). For example, Alice and Bob may be listed as friends in a social network database because one or both of them set up an explicit connection. In another implementation, the relationship may be implicit in that the GGM may determine, based on data available to it (e.g., data regarding interactions stored in Interactions table), that a relationship exists between Alice and Bob that can be deemed a friend relationship. For example, the GGM may include logic to track which users play together, note repeat linkages and infer a friend relationship therefrom. For example, if Bob ad Carol play online game G at least once a day together for five, seven (or any other suitable threshold) days, the online game logic might record the existence of a presumed "friend" relationship between Bob and Carol even if there is no explicitly expressed relationship. In another embodiment, determining friend relationships might involve a plurality of social graphs. For example, friends could be identified by relationships in a social graph set up by a company operating a social networking site and/or social graphs set up by an online game company. In one embodiment, social graphs can be multiple levels (e.g., there are friends of friends), and in some contexts, friends of friends are treated as friends (and that itself could be recursive). In one embodiment, social graphs may be unidirectional or bidirectional and different types of links may optionally be given different weights (e.g., explicit links may be given a weight of W, implicit links may be given a weight of W/2, and mutual links may be given a weight of 2W).

In addition to leveraging users' social graph information, embodiments of the GGM may facilitate engagement of new users, increase in revenue and enhancement of gaming experience for many users.

Online games have a variety of virtual items that may be purchased using virtual currency and/or obtained from in-game activities (e.g., farming, doing jobs or activities). In one embodiment, these virtual items may provide special abilities to the user in the game. Allowing low level characters easy access to those items may distort game play. For example, if all starting players can get a sword of instant death at the start, game play may be so distorted as to reduce engagement in the game. In one embodiment, the GGM may limit transfer of virtual items (e.g., bind virtual items to a particular account, bind to a particular character, bind on pickup, bind on use/equip, etc.) and/or level restrict items in an effort to check distortion. In another embodiment, the GGM may provide a controlled mechanism for providing a user an item they would otherwise not have access to from another player, increasing engagement of both the gift provider and the gift receiver in the online game.

GGM

FIG. 1 is an implementation of data flow among and between GGM components and/or affiliated entities for processing a resource request in one embodiment of a GGM operation. In one embodiment, a request 130 for a resource is received from a user 101 at a client device 105 that is communicatively coupled to the gaming server no (e.g., Zynga Game Network's Mafia Wars gaming server). In one implementation, the request may be made by the user via a gaming environment and/or platform (e.g., Mafia Wars gaming environment). The resource request from the client 105 may be communicated to the gaming server no for processing. In one implementation, the resource request 135 may include information regarding the request (e.g., user's UID and/or the like). The resource request may, in one implementation, be implemented in XML format.

At 140, the Gaming Server no may request social graph data 140 from Social Networking Server 115 (e.g., Facebook, MySpace, and/or the like). In one implementation, Gaming Server no may use an application programming interface (API) 102 to request social graph data 140 from Social Networking Server 115 and may receive the requested social graph data 145 in response. In an alternate implementation, social graph data that may have been previously received (e.g., when the user signed up to play the game, during a periodic update, and/or the like) and stored in the Social Graph table 1119b may be retrieved (e.g., using one or more SQL statements). At 150, Gaming Server 110 may query User Record table 120 and receive in response to the query user data records associated with the user's UID. At 160, Gaming Server no may query Game table and receive in response to the query game records associated with the user and the potential providers' UID. In one implementation, queries may be constructed using SQL statements.

The retrieved social graph data may be analyzed at 170 by interaction analysis component (IAC) to identify potential resource providers. For example, in one implementation, the social graph data of the user may be inspected to identify higher level players or players having a stronger in-game characteristic who can assist by purchasing a gift for the user.

The retrieved game records including game related details statistics and the retrieved user records including user data may be analyzed by engagement analysis component 175 and/or distortion analysis component 180. The engagement analysis component 175 may in one embodiment be configured to calculate engagement level of the user. In one embodiment, distortion analysis component 180 may be configured to calculate in-game distortion that may be caused by gifting mechanics, user behavior, and/or the like. The determined interactions, engagement and/or distortion may be associated with their UID and may be stored in the Game table 125. In one embodiment, based on the engagement, distortion and/or interactions analysis performed on the potential providers, a resource provider and/or resource likely to increase engagement and minimize distortion may be selected. The resource may then be provided to the user's account in the gaming environment. Reward processing component 185 may in one embodiment analyze game data and determine a reward for providing a resource to other users.

Figure 2:
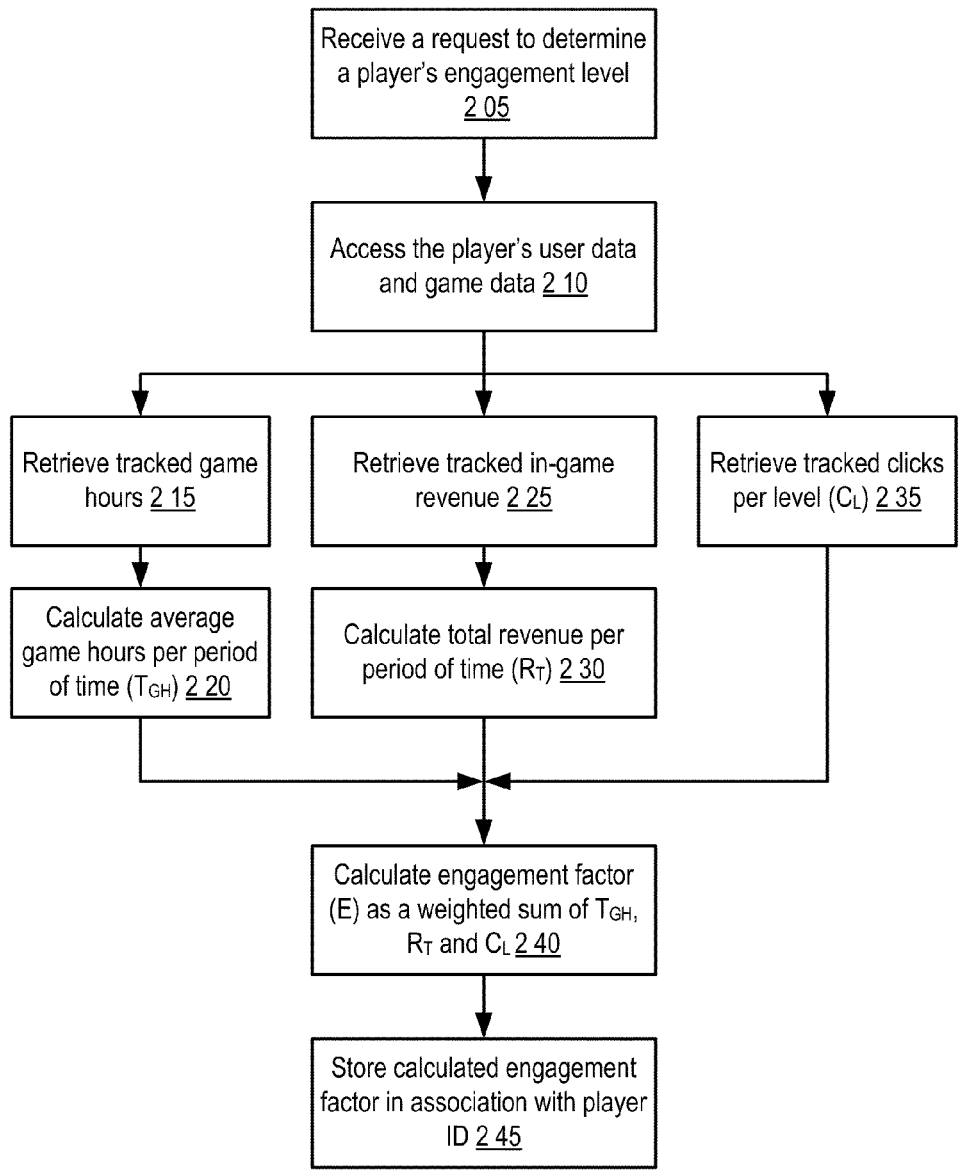
FIG. 2 is a logic flow diagram illustrating operation of an engagement analysis component (EAC) in one embodiment of the GGM.

FIG. 2 shows an implementation of logic flow for analyzing user engagement in one embodiment of GGM. A request to determine a user's engagement level in a game may be received at 205. In one implementation, the request may be user initiated. In an alternate implementation, the request may be generated by GGM in response to an event trigger (e.g., a user request to provide a resource, a periodic system generated request, etc). In response to the received request, GGM may access one or more user tables at 210. In one implementation, user and/or game tables may store user and/or game information. Game information may include information such as a user's game level, inventory, number of jobs, experience points, etc. User information may include user name, address, user ID, etc. At 215, the GGM may retrieve a history of the user's gaming behavior such as number of hours clocked in. Based on the tracked game hours, the GGM may calculate an average game hours per period of time at 220 (e.g., 30 hours/month, 10 hours/week, etc). GGM may also retrieve tracked in-game revenue from the user and/or game databases at 225. Based on the tracked revenue data, GGM may calculate total revenue per period of time (e.g., $100/month). Similarly, GGM may also keep track of other metrics such as number of actions (e.g., clicks, jobs, etc) performed per level at 235. GGM may at 240 calculate an engagement factor as a weighted sum of the calculated average game hours per period, calculated total revenue per period of time and the retrieved actions per level. In one implementation, GGM may assign weights such that influence of one of one or more of these factors is reduced. For example, if for instance, only the association between revenue and engagement is desired, the weights for the average game hours per period of time and the number of actions per level may both be set to zero and the engagement factor would be directly proportional to the calculated total revenue per period of time. The calculated engagement factor may be stored in one or more tables in association with the corresponding user's UID.

Figure 3:
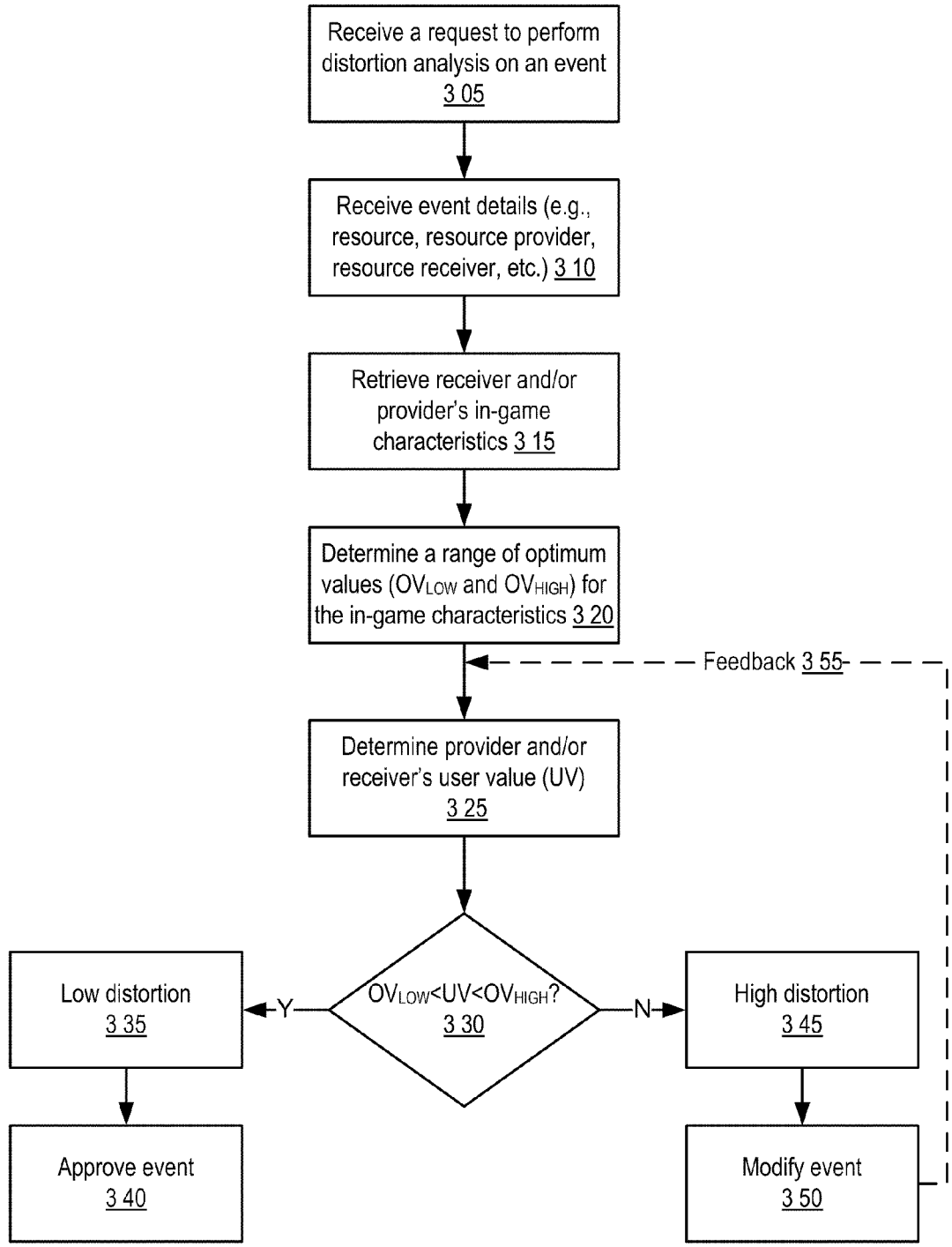
FIG. 3 is a logic flow diagram illustrating operation of a distortion analysis component (DAC) in one embodiment of the GGM.
Figure 4:
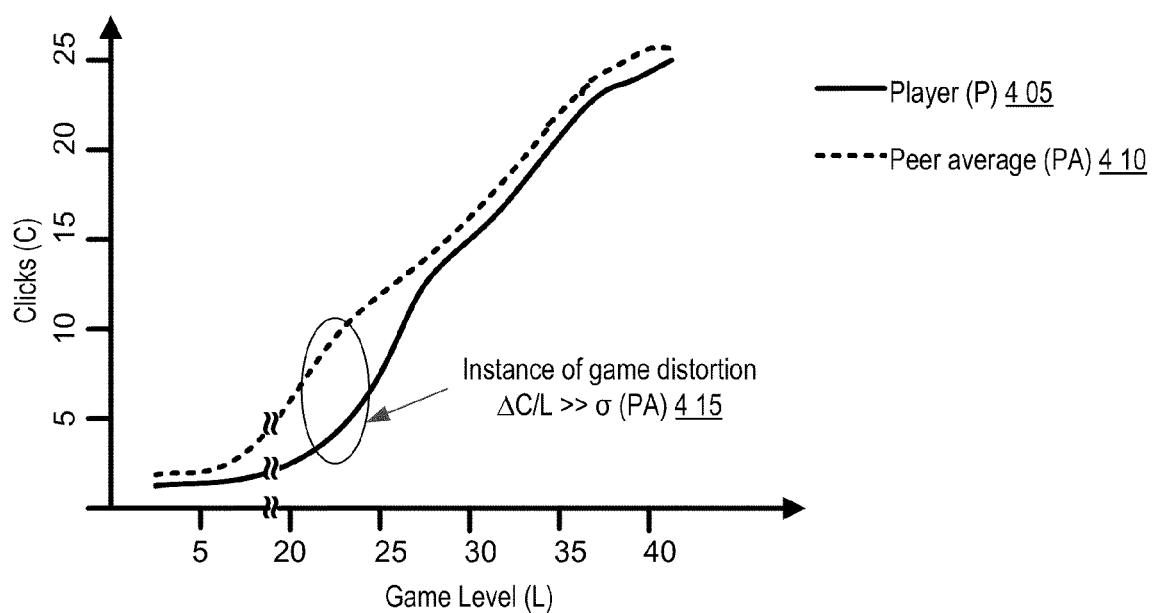
FIG. 4 is a graphical representation of game distortion in one embodiment of the GGM.

FIGS. 3 and 4 show aspects of distortion analysis component in operation in particular embodiments of GGM. In one embodiment, distortion analysis component may be configured to assess the impact of and/or determine in-game limits for providing high level items to low level users. For example, in one implementation, a higher level user may gift a level inappropriate resource to a lower level user, overpowering the lower level user. The lower level user may then easily defeat a higher level user creating distortion in the dynamics of game play. In one embodiment, the distortion analysis component may be configured as a distortion simulator. For example, a gaming operator may desire to introduce a new resource that may be gifted by one user to another. It may be beneficial to know the impact of the new resource on game distortion before it is made available to everyone in the gaming environment. It may also be advantageous to know how adjustments to the eligibility of the provider and/or receiver or application of rules and restrictions on the resource may optimize distortion levels.

In FIG. 3, a logic flow diagram is shown illustrating an implementation of the distortion analysis component. At 305, a request to perform a distortion analysis on an event may be received. Examples of an event may include a periodic system defined trigger (e.g., perform distortion analysis every week), a user achieving a milestone (e.g., a user receiving 3 gifts in a day), a user request for gift, a user request to send gift, etc. In one implementation, the request may be system generated to periodically assess distortion levels caused by introduction of new and/or test resources, items, gifts, rules etc in a gaming or simulated gaming environment. At 305, event details such as resource ID, resource requester UID, resource receiver or provider UID and/or the like may be received. User and/or game tables and/or databases may be accessed at 315 to retrieve relevant information such as the provider and/or the receiver's in-game characteristics and corresponding values. Examples of in-game characteristics may include game level, money, wins and/or losses, and/or the like. At 320, optimum range of values and/or limits for the in-game characteristics may be determined. In one implementation, the determination may be based on analyzing peer average values for the in-game characteristics. In another implementation, the optimum range of values for the in-game characteristics may be arbitrarily defined to encourage certain user behaviors. In yet another implementation, the optimum values may be based on system defined progress rate which may be retrieved from Rules table. A valuation of the requester's assets, resources, achievements, etc may be performed to determine provider and/or receiver's user value (UV) at 325. A comparison between the UV and the range of the optimum values may be made at 330. If the UV is outside of the range defined by the optimum values, a high level of distortion may be associated with the event at 345. In case of a high level of distortion, the event may be dynamically modified at 350 to minimize distortion. For example, if the event was a request for 3 shovels and it was determined that 3 shovels could result in high distortion, the distortion analysis component may modify the request and allow 2 shovels to be provided in order to manage distortion. In one implementation, a feedback 355 may connect modify event 350 to determine the provider and/or receiver's modified UV at 325. Subsequent to the determination at 325, a further determination at 330 to ascertain whether the modified UV is within the optimum range may be made. The modification and feedback may continue until the UV value is within the optimum range. In one implementation, instead of modifying the event, the distortion analysis component may cancel the event or suggest another event. On the other hand, if the UV is within the limits of the optimum value range, a low level of distortion may be attributed to the event at 325, which may be subsequently approved at 340.

In one embodiment, distortion may be desirable effect. For example, distortion may be deliberately introduced to game gifting dynamics. In one implementation, for example, a user of a high value may get his or event approved even if the level of distortion caused by the event is outside of the range of the optimum values. In one implementation, the value of a user may be a measure of spending power, strength of social network and/or interaction and/or the like.

In FIG. 4, an exemplary graphical representation of distortion in a gaming environment is shown. In one implementation, distortion may be modeled as a measure of a user's performance relative to that of his or her peer group. Examples of measurable performance in a gaming environment may include number of actions (e.g., jobs, clicks, etc) per level or stage, number of wins and/or losses per level or stage, rate of level jump, etc. In the particular implementation of FIG. 3, the number of clicks 415 per game level 420 is selected as a measurable performance. The number of clicks per level is tracked for both the user 405 and his or her peer group 410, which may include members of the gaming network and/or a social network. As shown in FIG. 3, when the number of clicks the user 405 needs to move to the next level is much lower than that needed by his or her peers 410, an instance of game distortion is identified.

Figure 5:
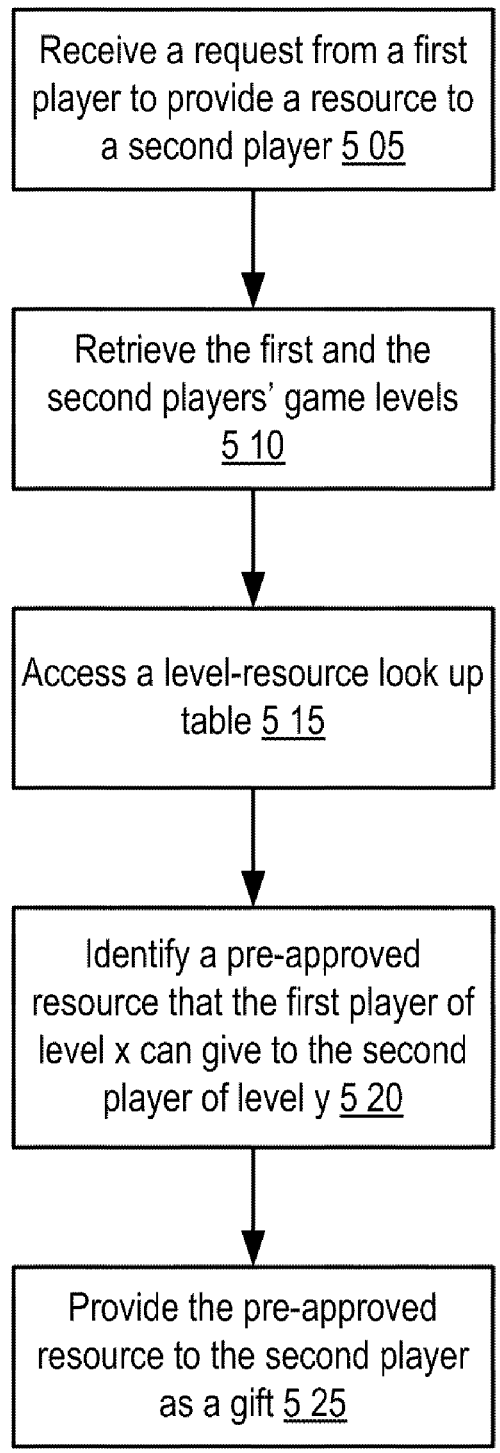
FIG. 5 is a logic flow diagram illustrating operation of a user initiated gifting component in one embodiment of the GGM.

FIG. 5 shows an exemplary logic flow diagram illustrating operation of a resource provider initiated gifting component. A user in a gaming environment may desire to assist another user by gifting one or more resources. Gifting of resources encourages passive cooperation and leverages "friend relationship" in social networks to attract new users. In the implementation illustrated in FIG. 5, a user may request the GMG component for permission to gift a resource to a second user. In one implementation, the second user may be a fellow participant of the user's gaming environment. In another implementation, the second user may simple be a member of the user's social network. In yet another implementation, the second user may be a member of a gaming environment different from the user's gaming environment, in which case the gifting would be inter-game. At 505, the GGM component may receive the request for permission to provide the resource to the second player. In response to the request, the GGM component may access the users' user and/or game databases to retrieve their game in-game characteristics at 510. In one implementation, in-game characteristics may include game levels, game stages, experience points, coins, virtual currencies, as well as other measurable characteristics. At 515, the GGM component may access a resource look up table comprising resources pre-approved for a combination of provider and receiver game characteristics. The GGM component may in accordance with the provider and receiver game characteristics identify a pre-approved resource for gifting at 520 and provide the identified resource as a gift to the receiver at 525. In one implementation, the GGM component may identify more than one resource that can be provided to the receiver. The provider may then select one or more of the identified resources and gift them to the receiver. In one implementation, the GGM component may be utilized to provide gifts to more than one receiver at the same time.

FIG. 6 shows an exemplary embodiment of a look up table illustrating resources mapped to provider and receiver game characteristics. In the particular implementation of FIG. 6, provider and receiver game characteristic levels 620 and 615 respectively are used to illustrate mapping of resources. In the resource look up table, each resource is uniquely mapped to a combination of receiver and provider characteristics. In an alternate implementation, mapping of the resources may not be unique. In the look up table, the resources are mapped according to rules, which in one implementation may be devised to have a calculated distortion and/or engagement impact. For example, in the positions marked "X," where the level of the receiver is equal to or higher than the level of the provider, gifting may be prohibited. In an alternate implementation, the positions marked "X" may contain resource items, which in one implementation may be of lesser value or have other usage restrictions. These resource items may be selected to adjust in-game distortion.

Figure 7:
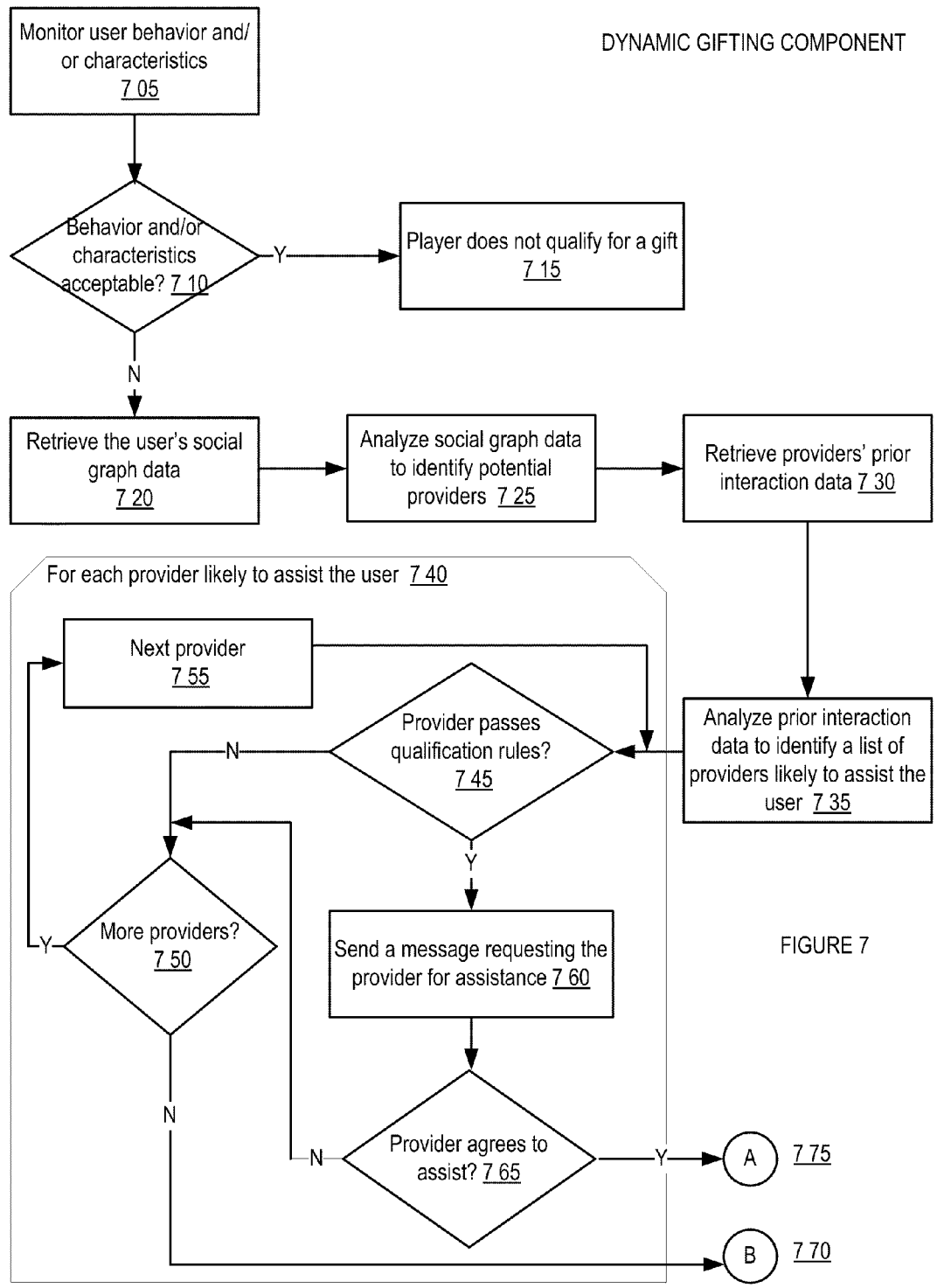
FIG. 7 and FIG. 8 are logic flow diagrams illustrating operation of a dynamic gifting component (DGC) in one embodiment of the GGM.

FIG. 7 illustrates operation of a dynamic gifting component in an exemplary embodiment of the GGM. The dynamic gifting component may monitor and/or track users' gaming behavior, gaming characteristics and/or interactions. Gaming behavior may include, in one non-limiting example, frequency of game sessions, length of each game session, time between game sessions, spending rate, and/or the like. In one non-limiting example, gaming characteristics may include a user's engagement level, gaming statistics including level, cash, gaming members, achievements, skill points, experience points, and/or the like. Interactions may include in one non-limiting example, user interactions in the user's gaming environment, with other gaming environments, within the user's social network, and/or the like. Non-limiting examples of interactions may include frequency of intra- and inter-game resource gifting, game related invites, wall posts, messages (e.g., via email, game message center or social network message center) and/or the like.

In the particular embodiment illustrated in FIG. 7, a user's behavior and/or characteristics are monitored and/or tracked at 705. In another implementation, the user's interactions may also be tracked and/or monitored. At 710, the tracked user behavior and/or characteristics data may be compared with one or more pre-defined and/or optimized thresholds to determine if the user's behavior and/or characteristics are acceptable. In one implementation, for example, the user's engagement level may be compared to an optimized engagement level threshold to determine if the user engagement is acceptable or if incentives may be provided to improve the user's engagement. At 715, the determination may indicate that the user's behavior and/or characteristics are acceptable and therefore the user does not qualify to receive a gift. In one implementation, the dynamic gifting component may be configured to allow the user to receive a gift despite having acceptable behavior and/or characteristics. In a further implementation, such a gift may have a reduced value and/or may be coupled with usage restrictions.

If the result of the comparison at 710 indicates that the user's behavior and/or characteristics are not acceptable, the social graph data may be retrieved at 720. In one implementation, social graph data associated with the user may be retrieved for analysis from the Social Graph database 1119b. In another implementation, social graph data may be retrieved by sending a request to a third party social network such as Facebook, MySpace, and/or the like (e.g., using a callback URL that includes the UID of the user or using the social network's API). At 725, the retrieved social graph data may be analyzed to identify potential resource providers. For example, the user's social graph data may be analyzed to identify other users with whom the user may have a relationship with, and hence are more likely to provide a resource to the user. In one implementation, proximity weights based on the type of relationship between the user and other users may be used in the analysis to identify potential providers. At 730, the potential providers' prior interaction data may be retrieved for analysis. In one implementation, interaction data association with the potential providers may be retrieved for analysis from the Interactions database 119g. The retrieved prior interaction data may be analyzed at 735 to identify a list of providers who are likely to assist the user. For example, if a provider has previously engaged in providing resources to other users, the provider may be more likely to engage again. In one implementation, volume and/or frequency of in-game, inter-game and/or social interactions between a provider and the user may be compared to established thresholds to identify providers who may be likely to assist the user.

At 740, for each identified provider who may be likely to assist the user, a determination whether the provider passes qualifications rules may be made at 745. In one embodiment, the qualification rules may be logic rules provided to prevent and/or manage distortion of the game mechanics by limiting and/or hindering the ability of providers to heavily influence other users or bestow unfair advantages to select users. In one embodiment, the qualifications rules may include may assist in ascertaining if a provider has engaged in more than a threshold number of gifting in a given session. For example, if a provider has already assisted seven users in a two hour session and the user is one of the seven users, the qualification rules may fail the provider and prevent further participation for a duration of time. In another embodiment, the qualification rules may be devised to encourage new interactions. For example, if a provider has assisted more seven users in a two hour session and five of the seven users are new interactions, the provider may pass the qualification rules and be qualified to provide a gift to the user.

If a provider passes the qualification rules, at 760, a message may be communicated to the provider requesting assistance to the user. Messages may be communicated via in-game and/or inter-game communication channels, email, social network communication channels (e.g., message, wall post, status post, etc in Facebook). In one implementation, the message may be directly communicated to the provider on behalf of the user. In another implementation, the user may be provided an option to select qualified providers to whom a message containing a request for assistance may be sent. The provider after receiving the request for assistance may decide whether to provide or refuse assistance. If the provider's decision at 765 is an agreement to provide assistance 775, an appropriate resource(s) for gifting may be suggested to the provider. In one implementation, an appropriate resource may be dynamically identified and provided to the user. If the provider refuses to assist the user, and if more providers are available for assistance 750, qualification process for the next provider 755 may be initiated. Once all the providers identified at 735 have been subjected to the qualification process 745, the dynamic gifting component may proceed to 770.

Figure 8:
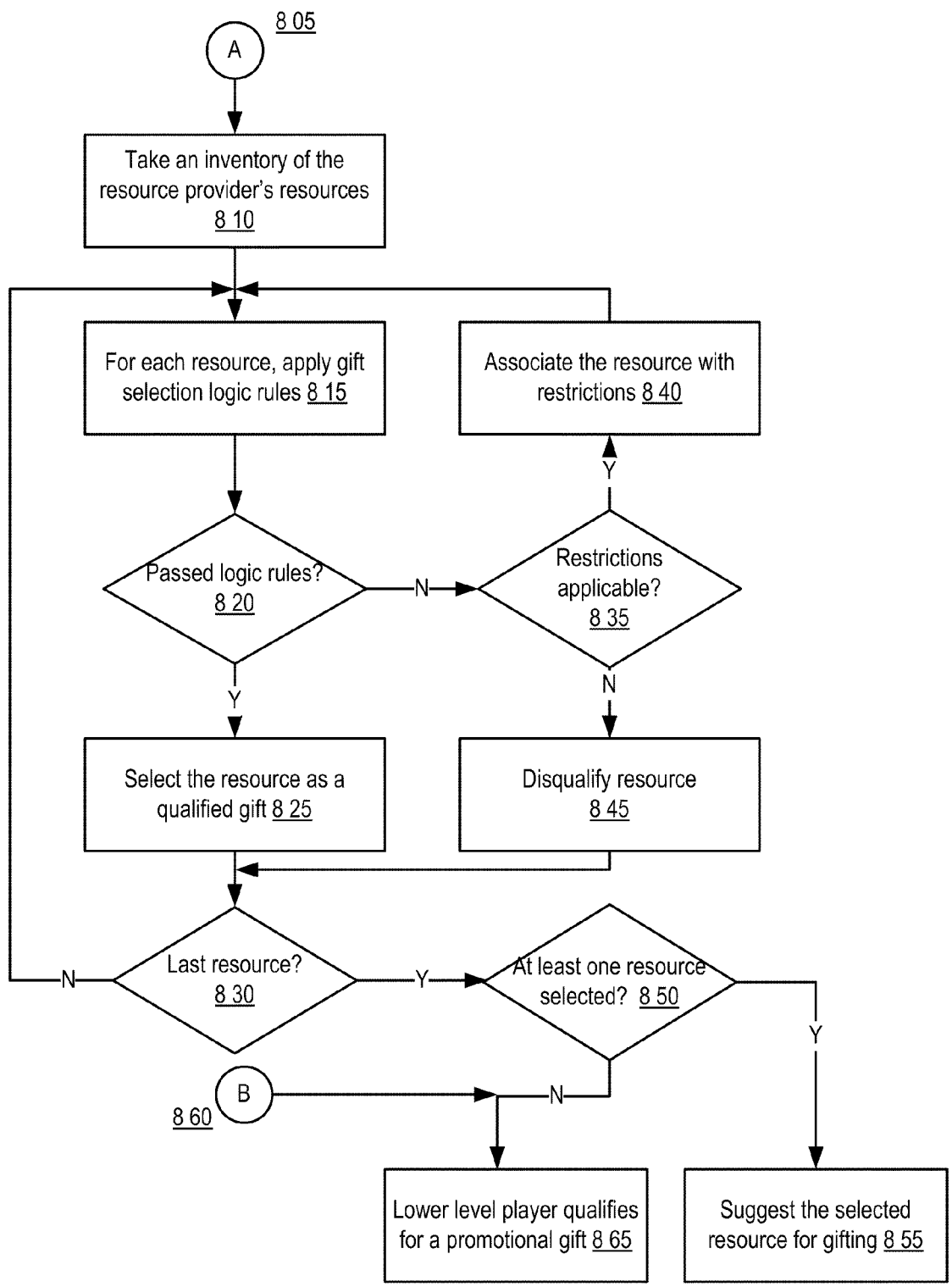

FIG. 8 illustrates resource selection operation of a dynamic gifting component in an exemplary embodiment of the GGM. At 805, a qualified provider who has agreed to gift a resource to the user has been identified. In the particular embodiment described, an inventory of the resource provider's resources may be taken at 810 with a view to suggest recommendations to the provider. In another embodiment, resources may be provided from a gift inventory maintained by the dynamic gifting component. In yet another embodiment, an inventory of the receiver's resources may be taken to determine an appropriate gift. For each resource, gift selection logic rules may be applied at 815. For example, in one implementation, some resources may be level inappropriate and such resources may not pass the gift selection logic rules. If the resource does not pass the logic rules, at 835 it may be possible to apply some restrictions that would qualify the resource for gifting. Examples of restrictions include shortening life of the resource. usage restrictions, and/or the like. If applicable restrictions may be found at 840, gift selection logic rules may be applied again at 815. If restrictions are not applicable at 835, the resource may be disqualified from consideration at 845. If the resources passed the logic rules at 820, the resources may be deemed appropriate and selected for gifting at 825. If the previously considered resource was not the last resource 830, next resource in the inventory may be considered for qualification. Otherwise, a determination may be made at 850 as to whether at least one resource has been successfully selected. When at least one resource has been selected, the dynamic gifting component may suggest the selected resource(s) for gifting at 855. If no resource was selected, the dynamic gifting component may automatically select a resource for gifting.

Figure 9:
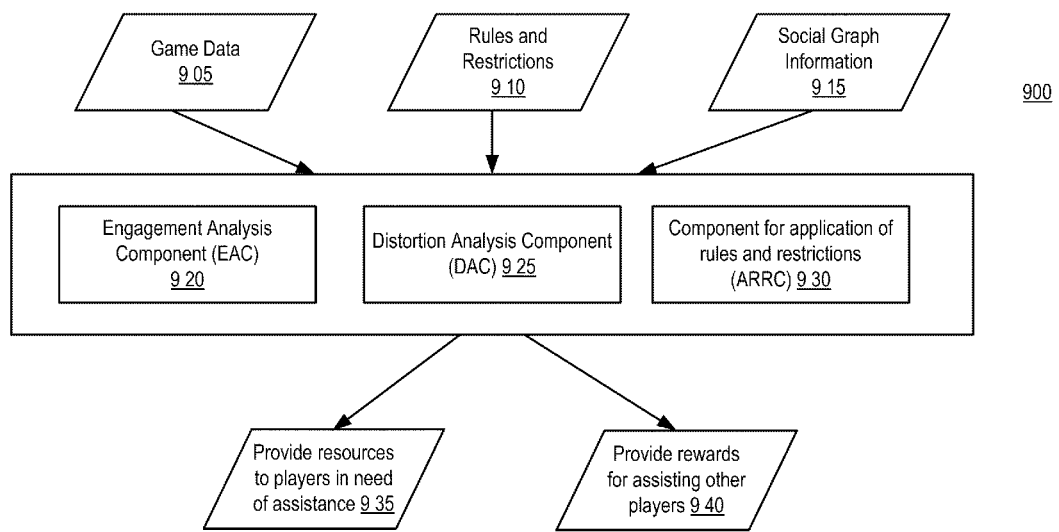
FIG. 9 is a data flow diagram illustrating providing of resource and reward in one embodiment of the GGM.

FIG. 9 shows a data flow diagram illustrating aspects of an embodiment of the GGM. FIG. 9 illustrates a system 900 for providing resources to users who may need assistance and rewarding users who assist others. The system 900 may comprise an engagement analysis component 920, a distortion analysis component 925 and/or a component for application of rules and restrictions 930. In one embodiment, one or more of these components may operate in association with each other to achieve optimum engagement and distortion effects. One or more of these components may be coupled to game data 905, rules and restrictions data 910 and social graph data 915. In one embodiment, engagement analysis component 920 may be configured to retrieve and process game data, rules and restrictions data and/or social graph data from associated tables and/or databases to calculate engagement metrics. In another embodiment, distortion analysis component 925 may be configured to receive and/or retrieve game data, social graph data and any other relevant information and process the data to determine distortion. In yet another embodiment, component 930 for application of rules and regulations may be configured to retrieve rules and restrictions formulated to achieve a predefined level of engagement and distortion. The processing of the game data and/or social graph data and application of rules and regulations may provide users at 935 resources that are most valuable and may provide rewards to the users at 940 whose contributions have led to most increase in value.

Figure 10:
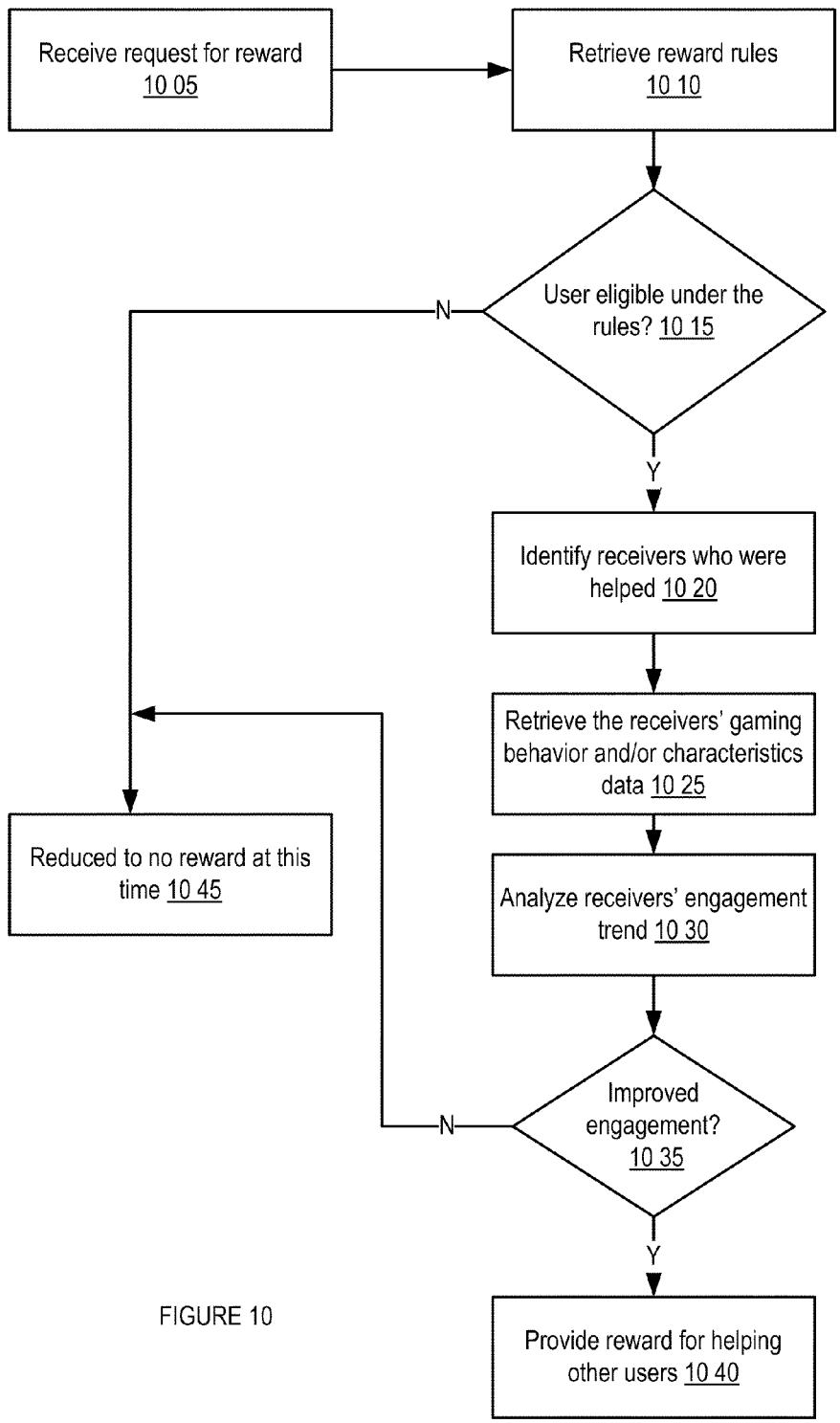
FIG. 10 is a logic flow diagram illustrating operation of a reward processing component (RPC) in one embodiment of the GGM.

FIG. 10 is a logic flow diagram showing operation of a reward processing component of GGM. A provider may be motivated by many reasons to help another user. For example, a user of a higher level may help another user of a lower level speed up to a higher level so that the two users may directly compete with each other. In another example, a user may be motivated by cooperative benefit, where if a provider gifts a receiver a resource, the receiver may in turn help the provider by gifting a resource. In yet another example, a user may engage in gifting for altruistic reasons. Whatever the motivations and/or reasons, a provider may be incentivized to experience gifting and continue gifting.

A request for reward may be received at 1005. In one embodiment, the request may be automatically generated in response to sending a gift to one or more users. In another embodiment, the provider may request a reward for gifting resources to other users. A determination of provider eligibility for a reward may be made at 1010. For example, in one implementation, eligibility for a reward may be based on eligibility criteria. Examples of eligibility criteria may include number of users helped by the provider (e.g., number of users helped must be higher than a minimum threshold and/or lower than a maximum threshold), ratio of number of resources received to number of resources gifted (e.g., ratio of less than 1), type of resource provided (e.g., provider purchased a resource for gifting, provider gifted a free resource, provider gifted a resource that may not be available for purchase) and/or the like. If the provider is eligible under the eligibility criteria, receivers of the provider's gifts may be identified at 1020. In one implementation, for example, receivers associated with the provider may be identified from interactions data stored in Interactions database 1119g. In one implementation an SQL query may be constructed to search for interactions associated with the provider (e.g., SELECT R_ID FROM Interactions WHERE U_ID='UID of the provider').

Gaming behavior and/or characteristics data of the identified receivers may be retrieved from associated databases at 1025 (e.g., using an SQL query statement). The retrieved data may be used to construct behavioral trends and/or patterns which may be analyzed to gauge the impact of the gifts on the receivers' gaming and/or social behavior and/or characteristics. In the particular implementation shown n FIG. 10, each receiver's engagement trend may be analyzed at 1030 to determine at 1035 any improvements in the trend (e.g., monotonically increasing engagement trend). If improvements in one or more receivers' engagement trends are observed as a result of receiving the gifts, the provider may be rewarded for his or her efforts at 1040. In one implementation, the reward may be dependent on the amount of improvement observed in one or more of the engagement levels (e.g., reward for 15% improvement may be more valuable than reward for 9% improvement). In another implementation, the reward may be dynamically adjustable (e.g., value of the reward may be known only at the time of use). If on the other hand, engagement trend observations indicate little or no improvement in engagement, a reward of reduced value or no reward may be given to the provider at 1045.

In one implementation, a logic flow similar to that described in FIG. 10 may be employed to analyze behavioral patterns (e.g., spending rate, time between sessions, number of sessions per period of time) constructed from tracked behavior data. The behavioral patterns may be analyzed to determine behavioral changes or pattern shifts as a result of gifting. For example, prior to receiving gifts, a receiver's behavior may be characterized as being reliant on jobs to earn cash to make virtual item purchases. After receiving gifts, the same receiver's behavior may be characterized as making virtual items purchases using real money and being less reliant on cash from jobs.

GGM Controller

Figure 11:
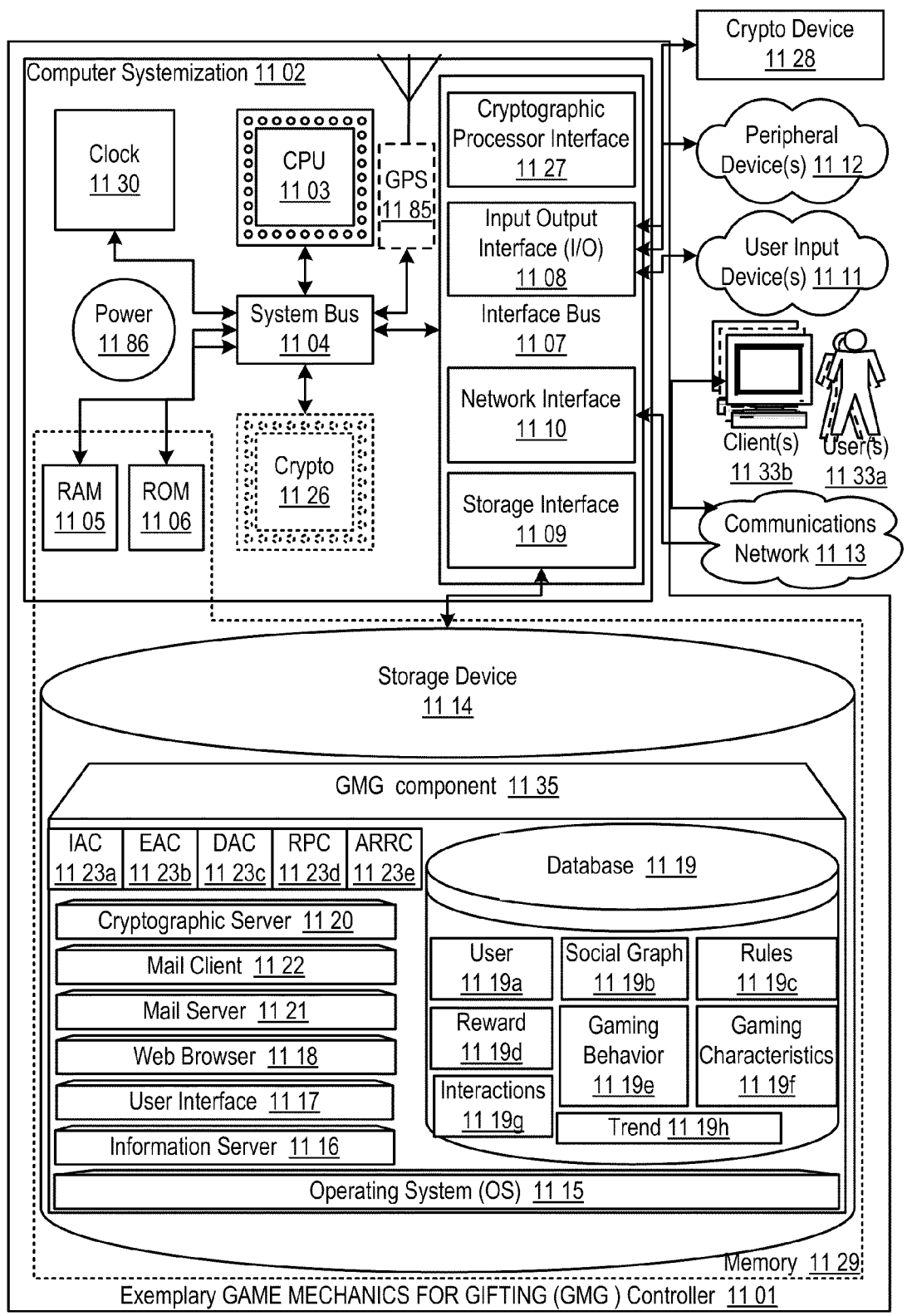
FIG. 11 is of a block diagram illustrating embodiments of the GGM controller.

FIG. 11 illustrates inventive aspects of a GGM controller 1101 in a block diagram. In this embodiment, the GGM controller 1101 may serve to aggregate, process, store, search, serve, identify, instruct, generate, match, and/or facilitate interactions with a computer through gaming interaction and behavioral data aggregation, processing, evaluation and gifting game mechanics technologies, and/or other related data.

Typically, users, which may be people and/or other systems, may engage information technology systems (e.g., computers) to facilitate information processing. In turn, computers employ processors to process information; such processors 1103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the GGM controller 1101 may be connected to and/or communicate with entities such as, but not limited to: one or more users from user input devices 1111; peripheral devices 1112; an optional cryptographic processor device 1128; and/or a communications network 1113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The GGM controller 1101 may be based on computer systems that may comprise, but are not limited to, components such as: a computer systemization 1102 connected to memory 1129.

Computer Systemization

A computer systemization 1102 may comprise a clock 1130, central processing unit ("CPU(s)" and/or "processor(s)" (these terms are used interchangeable throughout the disclosure unless noted to the contrary)) 1103, a memory 1129 (e.g., a read only memory (ROM) 1106, a random access memory (RAM) 1105, etc.), and/or an interface bus 1107, and most frequently, although not necessarily, are all interconnected and/or communicating through a system bus 1104 on one or more (mother)board(s) having conductive and/or otherwise transportive circuit pathways through which instructions (e.g., binary encoded signals) may travel to effect communications, operations, storage, etc. Optionally, the computer systemization may be connected to an internal power source 1186. Optionally, a cryptographic processor 1126 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the GGM controller and beyond through various interfaces. Should processing requirements dictate a greater amount speed and/or capacity, distributed processors (e.g., Distributed GGM), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the GGM may be achieved by implementing a microcontroller such as CAST's R8051XC2 microcontroller; Intel's MCS 51 (i.e., 8051 microcontroller); and/or the like. Also, to implement certain features of the GGM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the GGM component collection (distributed or otherwise) and/or features may be implemented via the microprocessor and/or via embedded components; e.g., via ASIC, coprocessor, DSP, FPGA, and/or the like. Alternately, some implementations of the GGM may be implemented with embedded components that are configured and used to achieve a variety of features or signal processing.

Depending on the particular implementation, the embedded components may include software solutions, hardware solutions, and/or some combination of both hardware/software solutions. For example, GGM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the GGM features. A hierarchy of programmable interconnects allow logic blocks to be interconnected as needed by the GGM system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the GGM may be developed on regular FPGAs and then migrated into a fixed version that more resembles ASIC implementations. Alternate or coordinating implementations may migrate GGM controller features to a final ASIC instead of or in addition to FPGAs. Depending on the implementation all of the aforementioned embedded components and microprocessors may be considered the "CPU" and/or "processor" for the GGM.

Power Source

The power source 1186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1186 is connected to at least one of the interconnected subsequent components of the GGM thereby providing an electric current to all subsequent components. In one example, the power source 1186 is connected to the system bus component 1104. In an alternative embodiment, an outside power source 1186 is provided through a connection across the I/O 1108 interface. For example, a USB and/or IEEE 1394 connection carries both data and power across the connection and is therefore a suitable source of power.

Interface Adapters

Interface bus(ses) 1107 may accept, connect, and/or communicate to a number of interface adapters, conventionally although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/or connect to a communications network 1113. Through a communications network 1113, the GGM controller is accessible through remote clients 1133b (e.g., computers with web browsers) by users 1133a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed GGM), architectures may similarly be employed to pool, load balance, and/or otherwise increase the communicative bandwidth required by the GGM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1110 may be used to engage with various communications network types 1113. For example, multiple network interfaces may be employed to allow for the communication over broadcast, multicast, and/or unicast networks.

Input Output interfaces (I/O) 1108 may accept, communicate, and/or connect to user input devices 1111, peripheral devices 1112, cryptographic processor devices 1128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1111 may be card readers, dongles, finger print readers, gloves, graphics tablets, joysticks, keyboards, mouse (mice), remote controls, retina readers, trackballs, trackpads, and/or the like.

Peripheral devices 1112 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the GGM controller may be embodied as an embedded, dedicated, and/or monitor-less (i.e., headless) device, wherein access would be provided over a network interface connection.

Cryptographic units such as, but not limited to, microcontrollers, processors 1126, interfaces 1127, and/or devices 1128 may be attached, and/or communicate with the GGM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1129. However, memory is a fungible technology and resource, thus, any number of memory embodiments may be employed in lieu of or in concert with one another. It is to be understood that the GGM controller and/or a computer systemization may employ various forms of memory 1129. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1129 will include ROM 1106, RAM 1105, and a storage device 1114. A storage device 1114 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1129 may contain a collection of program and/or database components and/or data such as, but not limited to: operating system component(s) 1115 (operating system); information server component(s) 1116 (information server); user interface component(s) 1117 (user interface); Web browser component(s) 1118 (Web browser); database(s) 1119; mail server component(s) 1121; mail client component(s) 1122; cryptographic server component(s) 1120 (cryptographic server); the GGM component(s) 1135; and/or the like (i.e., collectively a component collection). These components may be stored and accessed from the storage devices and/or from storage devices accessible through an interface bus. Although non-conventional program components such as those in the component collection, typically, are stored in a local storage device 1114, they may also be loaded and/or stored in memory such as: peripheral devices, RAM, remote storage facilities through a communications network, ROM, various forms of memory, and/or the like.

Operating System

The operating system component 1115 is an executable program component facilitating the operation of the GGM controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the GGM controller to communicate with other entities through a communications network 1113. Various communication protocols may be used by the GGM controller as a subcarrier transport mechanism for interaction, such as, but not limited to: multicast, TCP/IP, UDP, unicast, and/or the like.

Information Server

An information server component 1116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the GGM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the GGM database 1119, operating systems, other program components, user interfaces, Web browsers, and/or the like.

Access to the GGM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the GGM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the GGM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the GGM enabled nodes. The combined application may be nugatory on systems employing standard Web browsers.

Mail Server

A mail server component 1121 is a stored program component that is executed by a CPU 1103. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the GGM.

Access to the GGM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1122 is a stored program component that is executed by a CPU 1103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1120 is a stored program component that is executed by a CPU 1103, cryptographic processor 1126, cryptographic processor interface 1127, cryptographic processor device 1128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the GGM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the GGM component to engage in secure transactions if so desired. The cryptographic component facilitates the secure accessing of resources on the GGM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The GGM Database

The GGM database component 1119 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the GGM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the GGM database is implemented as a data-structure, the use of the GGM database 1119 may be integrated into another component such as the GGM component 1135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1119 includes several tables 1119*a-h*. A User table 1119*a* includes fields such as, but not limited to: a user_UID, user_name, and/or the like. The user table may support and/or track multiple entity accounts on a GGM. A Social Graph table 1119*b* includes fields such as, but not limited to: user_UID, total_friend_count, friend_deg_1_count, friend_deg_2_count, friend_deg_3_count_, game_friend_count, and/or the like. A Rules table 1119*c* includes fields such as, but not limited to: Game_ID, resource_qual_rules, level_value, money_value, wins_value, loss_value, and/or the like. A Reward table 1119*d* includes fields such as, but not limited to: reward_ID, game_ID, reward, and/or the like. A Gaming Behavior table 1119*e* includes fields such as, but not limited to: user_ID, session_freq, session_length, session_time, between session_time, spending_rate, and/or the like. A Gaming Characteristics table 1119*f* includes fields such as, but not limited to: user_ID, game_ID, level, cash, number_game_members, achievements, skill_points, xp_points, and/or the like. An Interactions table 1119*g* includes fields such as, but not limited to: user_ID, frequency_game_gifting, frequency_inter_game_gifting, number_invites, number_wall_post, number_message, and/or the like. A Trend table 1119*h* includes fields such as, but not limited to: engagement_trade, purchase_trend, interactions_trend, game_hours_trend, session_frequency_trend, gifting_trend, and/or the like.

In one embodiment, the GGM database may interact with other database systems. For example, employing a distributed database system, queries and data access by search GGM component may treat the combination of the GGM database, an integrated data security layer database as a single database entity.

In one embodiment, user programs may contain various user interface primitives, which may serve to update the GGM. Also, various accounts may require custom database tables depending upon the environments and the types of clients the GGM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1119*a-g*. The GGM may be configured to keep track of various settings, inputs, and parameters via database controllers.

The GGM database may communicate to and/or with other components in a component collection, including itself, and/or facilities of the like. Most frequently, the GGM database communicates with the GGM component, other program components, and/or the like. The database may contain, retain, and provide information regarding other nodes and data.

The GGMs

The GGM component 1135 is a stored program component that is executed by a CPU. In one embodiment, the GGM component incorporates any and/or all combinations of the aspects of the GGM that was discussed in the previous figures. As such, the GGM affects accessing, obtaining and the provision of information, services, transactions, and/or the like across various communications networks.

The GGM component may transform social graph, interactions, behavior, and characteristics data inputs via various components into optimized resource transfers and/or the like and use of the GGM. In one embodiment, the GGM 1135 takes inputs (e.g., request resource 135, receive social graph data 145 and 915, user data 150, game data 160 and 905, rules and restrictions 910, and/or the like) and transforms the input via various components (e.g., IAC 1123*a*, EAC 1123*b*, DAC 1123*c*, RPC 1123*d*, ARRC 1123*e*) into outputs (e.g., resource gifted 195, resources 935, rewards 940, and/or the like).

The GGM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the GGM server employs a cryptographic server to encrypt and decrypt communications. The GGM component may communicate to and/or with other components in a component collection, including itself, and/or facilities of the like. Most frequently, the GGM component communicates with the GGM database, operating systems, other program components, and/or the like. The GGM may contain, communicate, generate, obtain, and/or provide program component, system, user, and/or data communications, requests, and/or responses.

Distributed GGMs

The structure and/or operation of any of the GGM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the GGM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment. The following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application is directed to APPARATUSES, METHODS AND SYSTEMS FOR GAME MECHANICS FOR GIFTING. The entirety of this application (including the Cover Page, Title, Headings, Field, Background, Summary, Brief Description of the Drawings, Detailed Description, Claims, Abstract, Figures, Appendices, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a GGM individual and/or enterprise user, database configuration and/or relational model, data type, data transmission and/or network framework, syntax structure, and/or the like, various embodiments of the GGM, may be implemented that enable a great deal of flexibility and customization. For example, aspects of the GGM may be adapted for modeling gaming parameters to control user-gaming environment interactions. While various embodiments and discussions of the GGM have been directed to facilitating gifting in games, however, it is to be understood that the embodiments described herein may be readily configured and/or customized for a wide variety of other applications and/or implementations.

What is claimed is:

1. A processor-implemented method for identifying a gaming resource provider, comprising:
   receiving a request to provide a gaming resource to a user;
   aggregating by a processor user interaction data in response to the received request;
   analyzing by the processor the aggregated user interaction data;
   identifying by the processor a provider having prior interaction with the user based on the analyzing; and
   transmitting the received request for a gaming resource to the identified provider.

2. The method of claim 1, further comprising:
   applying at least one provider qualification rule to determine eligibility for receiving the transmitted request for a gaming resource.

3. The method of claim 1, further comprising:
   receiving an indication to provide a gaming resource to the user in response to the transmitted request;
   facilitating providing of a gaming resource to the user in response to the received indication;
   indentifying the facilitating providing of the gaming resource as an interaction between the user and the provider; and
   updating the user interaction data to include the identified interaction.

4. The method of claim 3, wherein the gaming resource provided to the user is selected in accordance with at least one resource selection rule.

5. The method of claim 3, wherein the gaming resource provided to the user is optimized for gaming behavior of the user.

6. The method claim 3, where in the gaming resource provided to the user is optimized for engaging the user to a gaming environment.

7. The method of claim 1, further comprising prior to transmitting the received request:
   monitoring the user's gaming behavior data over a period of time;
   calculating at least one in-game engagement metric in accordance with the monitored data;
   comparing the calculated engagement metric to an engagement threshold; and
   determining based on the comparing if the user is eligible to receive a gaming resource.

8. A processor-readable physical medium storing processor-issuable-and-generated instructions to:
   receive a request to provide a gaming resource to a user;
   aggregate user interaction data in response to the received request;
   analyze the aggregated user interaction data;
   identify a provider having prior interaction with the user based on the analyzing; and
   transmitting the received request for a gaming resource to the identified provider.

9. The medium of claim 8, further comprising processor-issuable-and-generated instructions to:
   apply at least one provider qualification rule to determine eligibility for receiving the transmitted request for a gaming resource.

10. The medium of claim 8, further comprising processor-issuable-and-generated instructions to:
    receive an indication to provide a gaming resource to the user in response to the transmitted request;
    facilitate providing of a gaming resource to the user in response to the received indication;
    indentify the facilitate providing of the gaming resource as an interaction between the user and the provider; and
    update the user interaction data to include the identified interaction.

11. The medium of claim 10, wherein the gaming resource provided to the user is selected in accordance with at least one resource selection rule.

12. The medium of claim 10, wherein the gaming resource provided to the user is optimized for gaming behavior of the user.

13. The medium claim 10, where in the gaming resource provided to the user is optimized for engaging the user to a gaming environment.

14. The medium of claim 8, further comprising processor-issuable-and-generated instructions that prior to transmitting the received request:
    monitor the user's gaming behavior data over a period of time;
    calculate at least one in-game engagement metric in accordance with the monitored data;
    compare the calculated engagement metric to an engagement threshold; and
    determine based on the comparing if the user is eligible to receive a gaming resource.

15. A system, comprising:
    a memory;
    a processor disposed in communication with said memory, and configured to issue a plurality of processing instructions stored in the memory, wherein the processor issues instructions to:

receive a request to provide a gaming resource to a user;
aggregate user interaction data in response to the received request;
analyze the aggregated user interaction data;
identify a provider having prior interaction with the user based on the analyzing; and
transmitting the received request for a gaming resource to the identified provider.

16. The system of claim 15, further comprising processor-issuable-and-generated instructions to:
apply at least one provider qualification rule to determine eligibility for receiving the transmitted request for a gaming resource.

17. The system of claim 15, further comprising processor-issuable-and-generated instructions to:
receive an indication to provide a gaming resource to the user in response to the transmitted request;
facilitate providing of a gaming resource to the user in response to the received indication;
indentify the facilitate providing of the gaming resource as an interaction between the user and the provider; and
update the user interaction data to include the identified interaction.

18. The system of claim 17, wherein the gaming resource provided to the user is selected in accordance with at least one resource selection rule.

19. The system of claim 17, wherein the gaming resource provided to the user is optimized for gaming behavior of the user.

20. The system claim 17, where in the gaming resource provided to the user is optimized for engaging the user to a gaming environment.

21. The system of claim 15, further comprising processor-issuable-and-generated instructions that prior to transmitting the received request:
monitor the user's gaming behavior data over a period of time;
calculate at least one in-game engagement metric in accordance with the monitored data;
compare the calculated engagement metric to an engagement threshold; and
determine based on the comparing if the user is eligible to receive a gaming resource.

\* \* \* \* \*